May 23, 1944.  O. W. SCHROEDER  2,349,761
STUFFED STRAW
Filed May 31, 1941  5 Sheets-Sheet 1
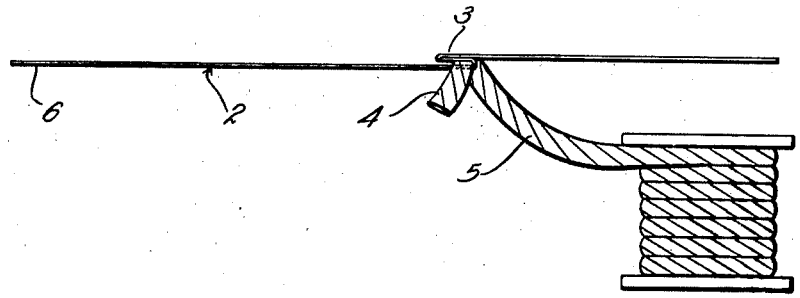
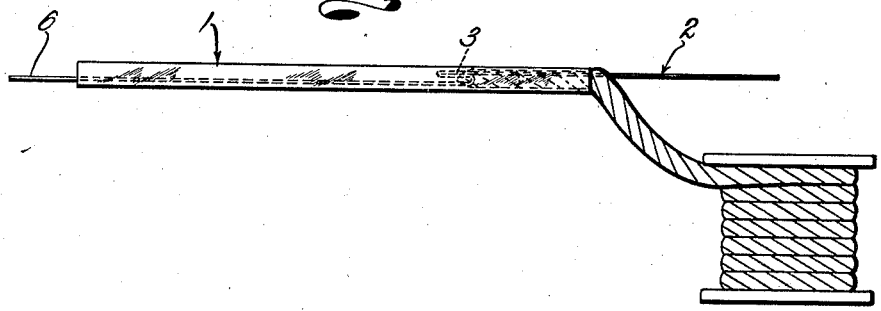
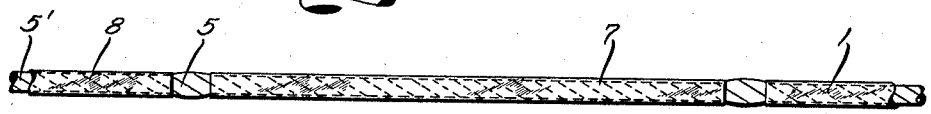
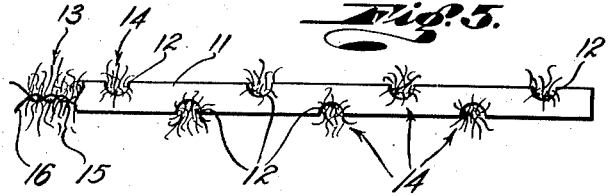
Inventor
OSCAR W. SCHROEDER
W H Beatty
Attorney May 23, 1944.  O. W. SCHROEDER  2,349,761
STUFFED STRAW
Filed May 31, 1941   5 Sheets-Sheet 2
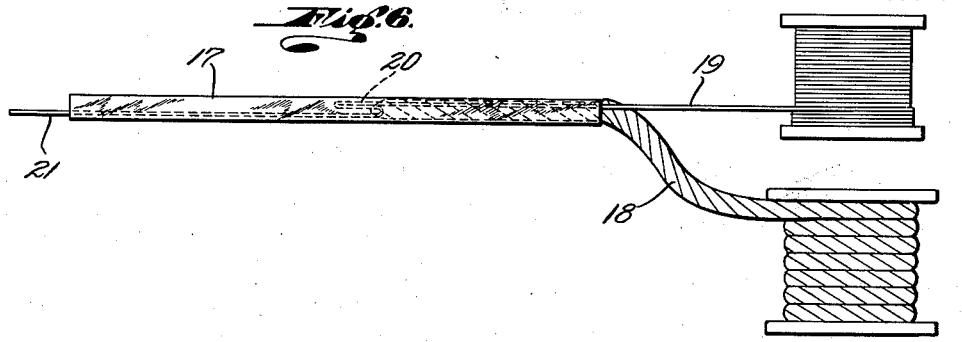
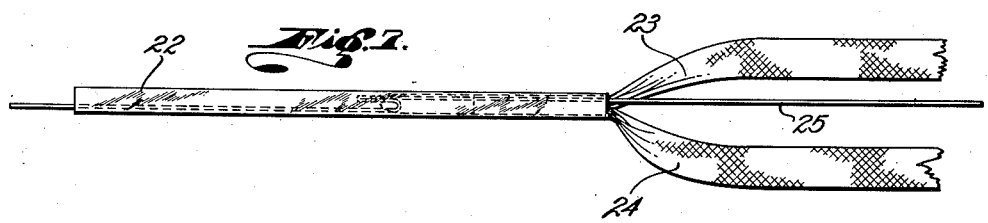
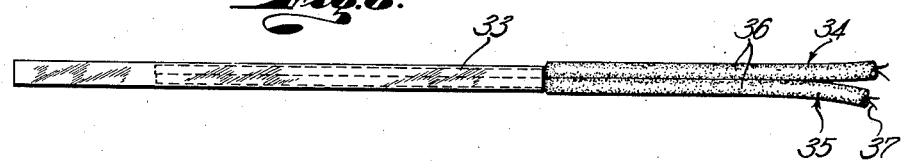
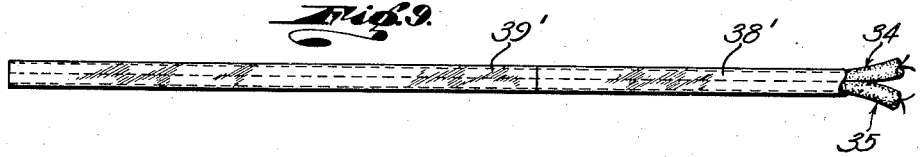
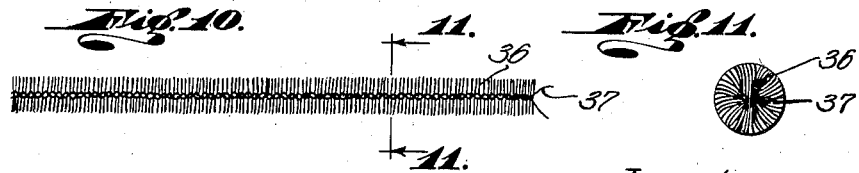
Inventor
OSCAR W. SCHROEDER
W. H. Beatty
Attorney May 23, 1944.   O. W. SCHROEDER   2,349,761
STUFFED STRAW
Filed May 31, 1941   5 Sheets-Sheet 3
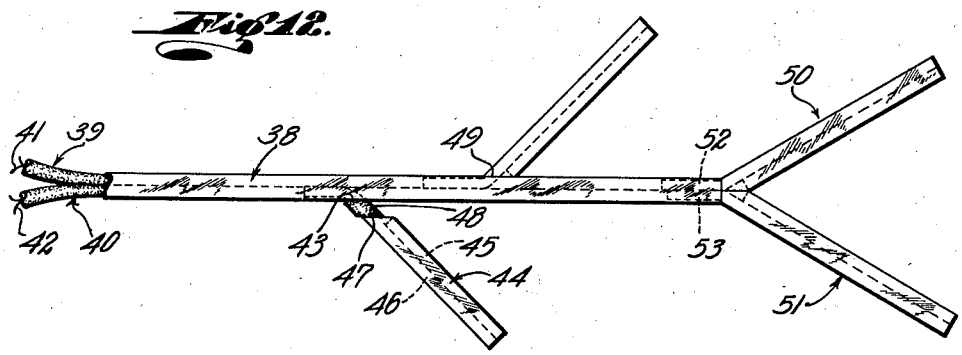
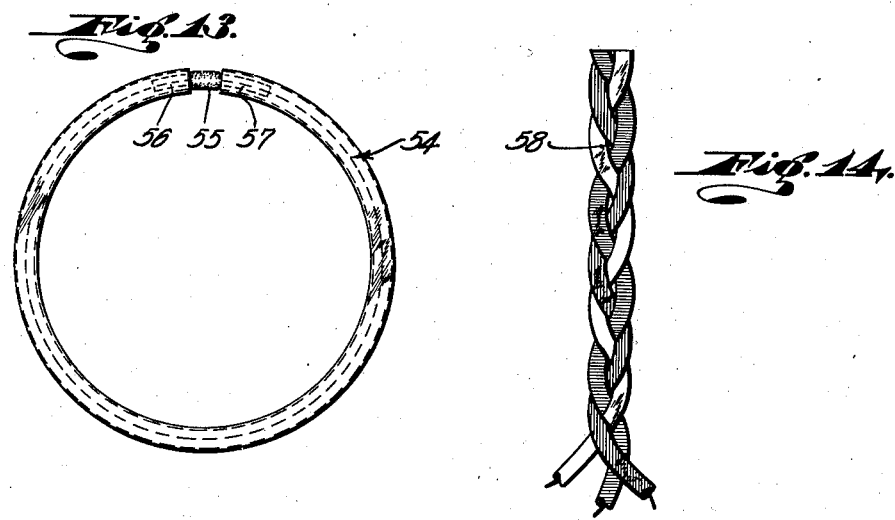
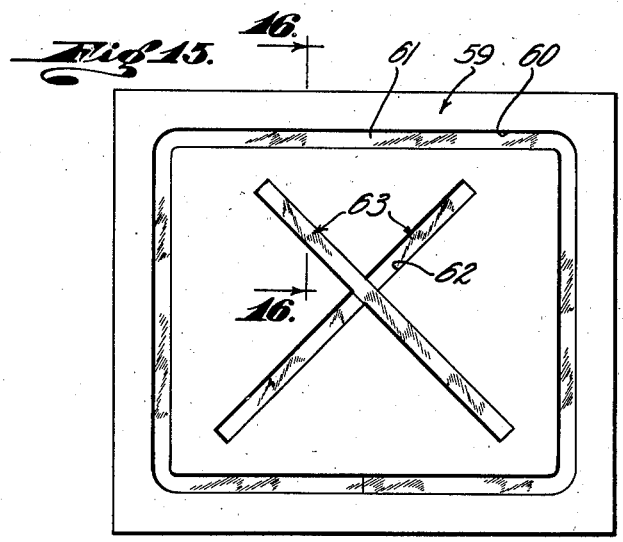
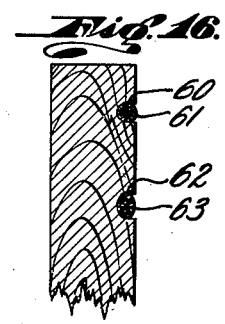
Inventor
OSCAR W. SCHROEDER
Attorney May 23, 1944. O. W. SCHROEDER 2,349,761
STUFFED STRAW
Filed May 31, 1941 5 Sheets-Sheet 4
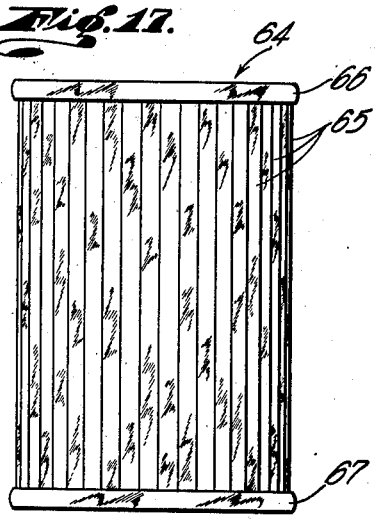
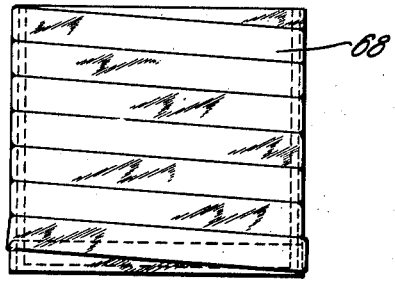
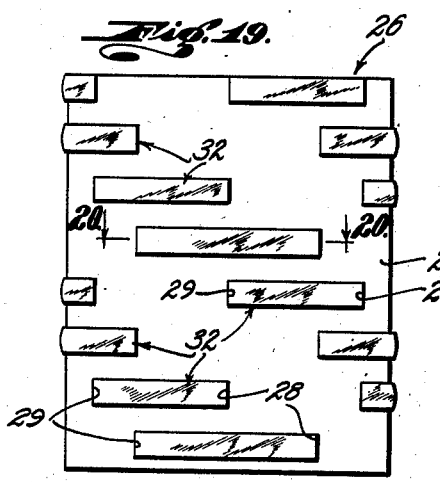
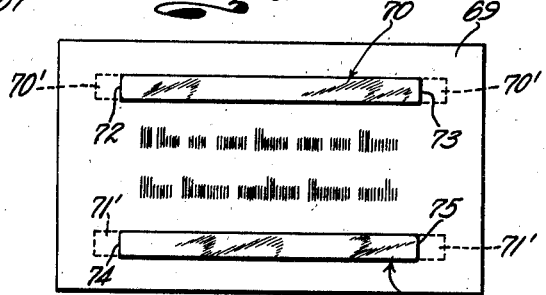
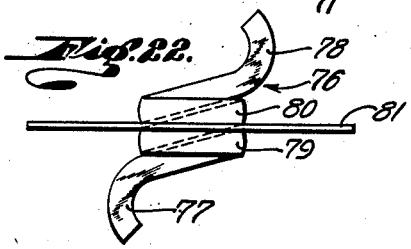
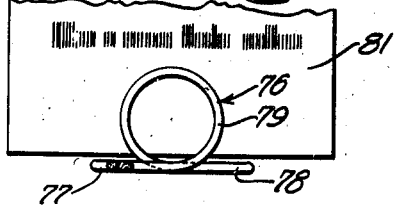
Inventor
OSCAR W. SCHROEDER
W h Beatty
Attorney May 23, 1944.  O. W. SCHROEDER  2,349,761
STUFFED STRAW
Filed May 31, 1941  5 Sheets-Sheet 5

Inventor
OSCAR W. SCHROEDER
W. W. Beatty
Attorney

Patented May 23, 1944

2,349,761

UNITED STATES PATENT OFFICE 2,349,761

STUFFED STRAW

Oscar W. Schroeder, North Hollywood, Calif., assignor of fifteen per cent to William E. Beatty, Los Angeles, Calif.

Application May 31, 1941, Serial No. 395,993

3 Claims. (Cl. 41—22)

The usual soda straw, which has been made of two strips of Cellophane or in some cases made in one integral straw such as the "glassit" straw heretofore has had a limited utility, namely as a soda straw, and in some cases has been used for decorative purposes simply by tying a bunch of such straws in the middle to make an artificial flower. In some cases, such straws have been made of Cellophane or the like of a solid color or with a stripe of color therein, but their artistic appeal and utility are rather limited. Also, such conventional straws have no body or mechanical strength, they crease when bent, they do not hold a distorted shape, and therefore, are not suited for use as a structural element in the decorative arts.

Even though such a straw is very flimsy, I have discovered that it is possible to stuff it with a core of decorative material. The core may be of strip material such as tinsel and need not entirely fill the inside of the straw or, the core may be compressible such as yarn and have a diameter which is normally larger than the inside diameter of the straw. By using a transparent straw I can thus provide it with a variety of decorative cores resulting in very artistic effects. Also, by adding to the decorative core a wire or the like, the composite strand thus produced will not only have strength but will retain the shape into which it is bent, the straw and the core being flexible. The straw thus becomes an element having not only artistic appeal, as the decorative core can be seen through the transparent straw, but also a thing having body and mechanical strength, due to the core, with or without a wire therein.

I have also discovered that the end of a conventional straw is strong enough so that I may take a single long core and thread it in succession through a plurality of straws by pushing on one straw to thereby push the other straws along the core.

The invention therefore relates to stuffed straws and in particular to a composite strand composed of a Cellophane or similar tube having a stuffing of decorative material whereby a hollow and more or less flimsy straw such as a conventional soda straw and which has no body or resistance to collapse when fabricated into an article, may be given substance and strength to permit such fabrication without collapsing the tube, and whereby any suitable decorative material may be employed to produce strands having a variety of color and artistic effects.

An object of the invention is to stuff an existing or pre-formed straw or tube such as a Cellophane or "glassit" soda straw, transparent or opaque, which in the case of the transparent straw is provided with a decorative core with or without a reinforcing wire core so that the straw will retain the shape into which it is bent, and which in the case of the opaque straw is provided with a core which forms a body but need not be decorative, as it cannot be seen unless portions of the tube are perforated as hereafter disclosed, and which may or may not also be provided with a wire core for reasons above stated.

A further object of the invention is to provide a straw as above described, with a core of such a nature that the composite strand thereby produced will retain the shape into which it is bent, whereby the strand may be employed as a structural element; for example, to form a standard to support display articles or to form the branch of an artificial flower.

A further object of the invention is to join a plurality of such composite strands of a given length to form a strand of greater length.

A further object of the invention is to splice such composite strands.

A further object of the invention is to provide a composite strand which is attractive in appearance, having substantial body, strength and flexibility without collapsing when bent, and having a decorative core which is visible through and enclosed in a flexible transparent water-proof tube.

A further object of the invention is to simplify the manufacture of such composite strands, by starting with preformed straws, whereby the use of complicated machinery may be avoided.

For further details of the invention, reference may be made to the drawings wherein Fig. 1 is a schematic view in elevation of a device for threading a decorative core into a straw not shown.

Fig. 2 is a schematic view of a step later than that shown in Fig. 1, with the decorative material being partly threaded into a straw.

Figs. 3 and 4 are schematic plan views illustrating the steps of joining short straws on a long core to make a long composite strand.

Fig. 5 is a plan view illustrating a composite strand having perforations through which the decorative core projects.

Fig. 6 is a schematic view in elevation illustrating threading a decorative core and a reinforcing wire in a straw.

Fig. 7 is a modification of Fig. 6 illustrating another type of decorative core.

Figs. 8 and 9 are modifications wherein the core material is rigid enough to form its own threading device.

Fig. 10 is a plan view of composite core material for use in connection with Figs. 8 and 9.

Fig. 11 is a section on line 11—11 of Fig. 10.

Fig. 12 is a plan view illustrating the method of splicing composite strands together.

Fig. 13 is a plan view illustrating the use of core material to couple the ends of a composite strand together to form a ring.

Fig. 14 is a plan view illustrating a braid of composite strand material.

Fig. 15 is a plan view and Fig. 16 is a section on line 16—16 of Fig. 15 illustrating the use of the composite strand for decorating wood or the like.

Figs. 17, 18, 19; and 20 which is a section on line 20—20 of Fig. 19, illustrates the use of the strand material for decorating the exterior surface of a container.

Fig. 21 illustrates the use of the strand material for decorating greeting cards or the like.

Fig. 22 is a plan view and Fig. 23 is a side elevation of the use of the strand material as a structural element, namely a card holder.

Figure 24:
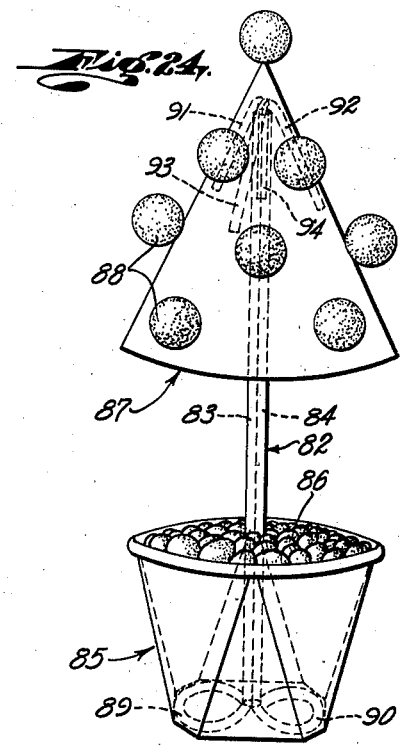
Figure 25:
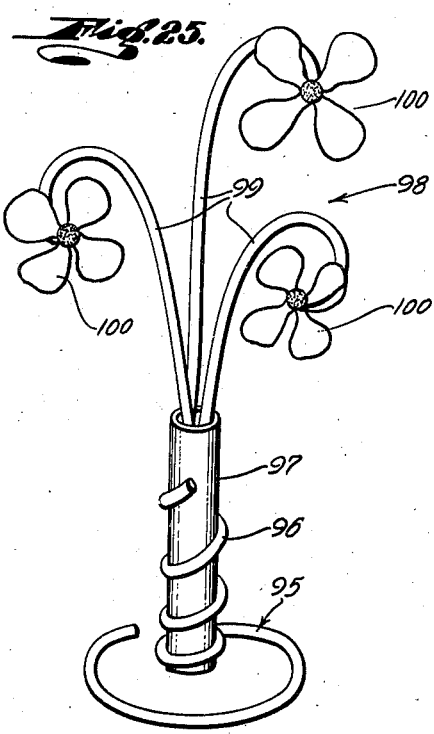
Figure 26:
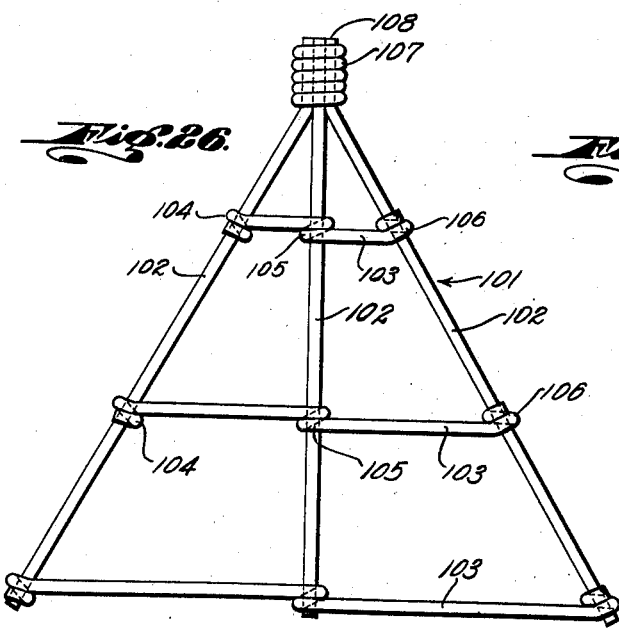

Figs. 24, 25 and 26 illustrate modified uses of the strand material as structural elements.

Figure 27:
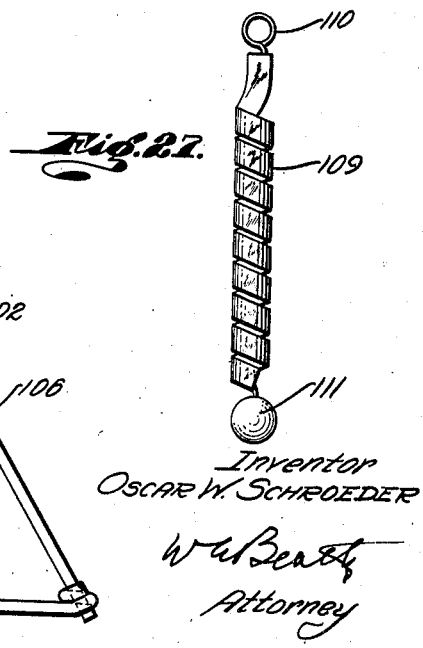

Fig. 27 is a plan view of a coil of the strand material suitable for ornamental purposes such as a Christmas tree ornament.

Referring in detail to the drawings, in Figs. 1 and 2, I stuff a straw 1 such as above described by employing a needle of wire 2 having a reverse bend 3 to engage the end 4 of decorative material 5, which is to form the core of the straw 1. The needle 2 is longer than the straw 1 and after being inserted therein so that the end 6 of the needle 2 projects from the far end of the straw 1, the projecting end 6 is grasped in one hand and the straw 1 in the other, and by pulling or giving a sharp jerk, the core 5 is pulled through the straw to entirely fill the same as illustrated in Fig. 3. In this manner, a series of straws such as 7 and 8 as shown in Fig. 3, may be threaded with the core 5, the adjacent ends of the straws 6—7, and 7—8, being strong enough so that by grasping straw 8 and pulling on the projecting end 5' of core 5, as many as eight or ten straws may be pushed along the core 5 to expose the needle 2 so that it may be threaded into the next straw. That is, one of the straws pushes the remainder along the core 5.

As above described, the straw 1 is preferably of transparent Cellophane, colored or plain, and the core 5 is of decorative material which may be silk or wool cord, as illustrated, or it may be a variety of other materials such as silver or gold tinsel, ribbon or cloth, etc.

Also, the core 5 may be of larger normal diameter than the inside diameter of straw 1 for the reason that if compressible fibrous material such as wool or silk cord is used, or if other fibrous material is used, it is compressible enough and the end of straw 1 is strong enough so that the core material may be compressed sufficiently to enter the straw 1 by simply stuffing or threading it therein, as shown in Fig. 2 (also Figs. 6, 7, 8).

Straws are now available in about eight inch lengths and also in other lengths up to about forty inches. Such straws may be used as above described, and if it is desired to have a finished straw which is greater in length than any of the lengths mentioned, the adjacent ends of the straws may be coupled together by compressing the end of one straw, as shown at 9 in Fig. 4, to reduce its diameter, the core 5 and the straw 8 being flexible and compressible, and by inserting the compressed end 9 into the adjoining end of the next straw 7. The other end of straw 7 may be similarly coupled to straw 1 as indicated at 10 in Fig. 4.

Instead of using a transparent straw, I may employ an opaque straw 11 as shown in Fig. 5. I first flatten this straw and then cut or punch out holes in it at spaced intervals as shown at 12. I then stuff the straw 11 with a decorative core 13, whereby the core material projects through the holes 12 as indicated at 14. In this case, the core 13 may be of fibrous material 15 having a wire core 16, the core 13 having sufficient strength so that it may be stuffed or pushed into the straw 11 without using a needle 2.

Referring to Fig. 6, the straw 17 which may be transparent or opaque as above described, is provided with a decorative core such as cord 18 or the like, and with a wire core 19 by providing the wire 19 with a hook 20 to clasp the end of the core 18 and by continuing the wire 19 to form a projecting end 21 which serves as a needle or threading device. The end 21 of the wire 19 is inserted in the straw 17 until the end 21 projects beyond the end of the straw 17 as shown in Fig. 6, and then the end 21 may be grasped in one hand and the tube 17 in the other to thread the core 18 and the wire 19 through the full length of the straw 17. In fact, a series of such straws may be threaded on the core 18 and the wire 19 as described in connection with Fig. 3.

Referring to Fig. 7, the straw 22, as described in Fig. 6, may be stuffed with a core of other decorative material such as gold or silver tinsel 23, 24, and a wire 25.

Referring to all of the above mentioned figures, the core material, after it has been threaded through one straw, or through the desired number of straws, is cut off at each end of each, or at the two ends of the group of straws.

The wire 19 in Fig. 6 and 25 in Fig. 7 may be copper or silver wire which is flexible and which will retain the straw in any position in which it is bent, as illustrated for example in Figs. 19 and 20 which shows a container 26 of cardboard or the like having a cylindrical wall 27 provided with slits 28, 29 through which the ends 30 and 31 of a short section of a straw 32 having a wire core 19—25 described in Figs. 6 and 7, are inserted and bent back against the inside wall of the container as illustrated. The wire core thus serves to retain the straw 32 in position, and no other fastening means are necessary. The straws 32 may be thus inserted in the wall 27 in staggered fashion or in any other fashion as illustrated in Fig. 19, the straws 32 thus providing a cheap and artistic decoration for the container 26.

Referring to Fig. 8, I may stuff the straw 33 with a pair of cores 34, 35 each comprising fibrous material 36 having a wire core 37 as shown in Figs. 10 and 11. The cores 34 and 35 may be inserted through adjoining straws 38', 39' if desired as shown in Fig. 9, wherein the adjacent ends of the straws abut without overlap as in Fig. 4.

Fig. 12 illustrates a method of splicing stuffed straws. I first take, as shown in Fig. 8, a straw 38 having a pair of cores 39, 40 therein, each having a wire core 41, 42 respectively, and then I form a slit 43 in the side of the straw 38.

Then, I take a short section of straw 44 having two cores 45, 46, therein, each of these cores being as shown in Fig. 10. I cut the end of straw 44 at a desired angle as shown at 47 and cut off the core 45 at this length, while leaving the other core 46 project about an inch or more as indicated at 48. I then insert the projecting core 48 through the slit 43, the cores 39 and 40 being compressible enough to allow the core 48 to also be inserted in the straw 38. The core 48 is inserted in the slot 43 until the end 47 of straw 44 comes flush with the outside of straw 38 as indicated at 49. As the core 48 has a wire core not shown, but as indicated in Fig. 10, the core 48 when inserted in straw 38 is strong enough to hold the straw 44 in its outwardly projecting position. The spliced straws such as 44 may serve as the branches of an artificial flower and the ends thereof may be provided with an artificial flower such as shown in Fig. 25, or other ornament. The end of straw 38 may thus be provided with two stuffed straw branches 50, 51 forming a Y and having a portion of the cores thereof as indicated at 52 and 53, respectively, inserted into the end of straw 38.

Referring to Fig. 13, I may take a straw having a pair of cores therein as shown in Fig. 8, and bend the ends together to form a ring 54, and couple the ends together by the use of a short section 55 of core material as shown in Fig. 10, the insert 55 being pushed partly into one end 56 and partly into the other end 57 of the ring 54. The ends 56, 57 may be then pushed together until they meet. No other fastening means is necessary to hold the ends 56, 57 together to form a ring 54.

Referring to Fig. 14, the stuffed straw as made in Fig. 2, 6, 7 or 8 may be interlaced or braided as shown at 58 in Fig. 14, and the braid thus formed may be employed for a variety of uses such as a bracelet, belt or the like, in which case the usual fastening accessories would be added thereto.

Referring to Fig. 15, the stuffed straw made as above described, may be employed to decorate various articles such as furniture, signs and the like. This use is illustrated by the block of wood 59 which is provided with a rectangular groove 60 in which is laid and secured by adhesive in groove 60, a straw 61 which is bent so as to substantially fill the groove 60. The straw 61 may have a wire core as in Figs. 6 to 8 or as in Fig. 3. Similarly the base or block 59 is provided with other grooves indicated by the letter "X" at 62, and in this groove is laid a straw 63. If desired, a coat of varnish not shown may be applied over the outer surface of the straws 61, 63 and the adjacent surface of the block 59. The straws 61, 63 may be secured by adhesive or otherwise to the flat surface of block 59 if desired.

Referring to Fig. 17, a cylindrical container 64, which may be of heavy paper or cardboard as described in connection with Figs. 19 and 20, has its exterior decorated by applying adhesive to the exterior of the container 64, and then by laying lengthwise thereon a plurality of closely spaced straws 65 as above described. These straws are preferably transparent, with a decorative core therein, and may or may not have a wire core. Some of the straws 65 may be of one color and others of another color and the same is true of the straws 32 in Fig. 19. The end of straws 65 at the top and bottom of container 64 are concealed by rings 66 and 67 which also may be of stuffed straws in accordance with any of the forms above described.

Instead of securing the straws lengthwise on the outside of a container, I may form a spiral wrap as indicated at 68 in Fig. 18. After straw 68 is wrapped on the container, it may appear somewhat flattened like ribbon as shown, in case the core material is of tinsel which does not completely fill the straw, as indicated in Fig. 7.

The stuffed straws such as indicated at 32 in Fig. 19, instead of being employed to decorate the outside of a container, may be employed to decorate a greeting card 69 as shown in Fig. 21, wherein the straws 70 and 71 are secured to the card 69 by inserting the ends of these straws through slits 72, 73 (for straw 70), 74, 75 (for straw 71), the ends of these straws at the back of the card 67 being bent back, similar to the manner shown in Fig. 20, and as shown in dotted lines at 70' for straw 70, and 71' for straw 71.

A stuffed straw made as above described and with a wire core as indicated in Fig. 7, may be employed to serve as a card holder as shown in Figs. 22, 23. For this purpose I take a straw 76 and bend the ends 77, 78 thereof into a plane so that these ends will lie flat on a table, while bending an intermediate portion into two closely spaced circular loops 79, 80, the planes of which extend at right angles to the plane of the ends 77, 78. Between the loops 79 and 80 I insert a card or the like 81 which is thus supported by these loops when the ends 77, 78 are resting on a support. The straw article in Figs. 22 and 23 thus serves as its own base while providing a support for another article such as the card 81.

A further example of the use of a stuffed straw as a structural element is illustrated in Fig. 24 wherein the straw 82 has two fiber cores 83, 84 each having a wire center as indicated in Figs. 8 to 11. The straw 82 may be opaque if desired, as its principal function of Fig. 24 is a mechanical one rather than a decorative one. The straw 82 serves as a standard centrally arising from a paper cup or other container 85 which may be filled with candy, nuts or the like 86, the straw 82 serving at its upper end to support an inverted conical paper cup or the like 87 having suitable ornamentation indicated at 88. The cores 83, 84 project beyond the ends of straw 82 at both ends thereof. At the lower end of straw 82, the cores 83, 84 are each bent to form a ring such as 89, 90 which serve as a base to support the straw 82 which is held in position by the condiment 86. Also, cores 83, 84 project beyond the upper end of straw 82 and are bent downwardly as shown at 91, 92 to engage and support the inside of the top piece 87. An additional support at the top of straw 82 is provided by taking a short length of the wire core material as indicated at 93 and by inserting the end thereof into the straw 82, the inserted end of straw 93 being indicated by dotted lines at 94. This insert 93 is somewhat similar to the insert or coupling piece 55 in Fig. 13.

Fig. 25 illustrates another use of the straw having a decorative and wire core as indicated in Fig. 7 or 8. In Fig. 25, the straw 95 which may have a decorative and wire core therein is bent in a large circle in a plane to form a base, with an extension of one end thereof bent in a spiral 96 to engage the outer surface of a container 97 which is supported thereby. The straw base 95 and the base of container 97 rest on a table or the like not shown. The container 97 may be ornamented with artificial flowers 98 which may be made according to present invention by employing the straw of Fig. 7 as the branch or stem of the flower as indicated at 99, and by affixing a suitable artificial flower 100 to the end of each stem or branch.

Fig. 26 illustrates another structural use, wherein a trellis 101 has lengthwise pieces 102 which are held in spaced relation by cross pieces 103 bent therearound as indicated at 104, 105, and 106. The converging portion of the trellis 101 may be given a spiral wrap as indicated at 107, this spiral wrap 107 and the framework of the trellis 101 being of transparent straws having a decorative core and a wire core therein as indicated in Fig. 7. The trellis 101 may be turned right side up and its base 108 may be suitably supported for example by impaling it on a frog in a flower dish.

The straws above described, either with or without a wire core, may be twisted in spiral form as indicated at 109 in Fig. 27, and serve as an ornament for a Christmas tree or the like. The upper end of straw 109 may be provided with a cord loop 110, and to the lower end thereof may be secured a suitable ornament as indicated at 111.

It will be apparent that various modifications may be made in the invention without departing from the spirit of the following claims, for example different sizes of wire may be used for the wire core depending on the structural strength desired for the finished article.

Also, it will be apparent from the above description, that the transparent straws above described may be as thin as ordinary paper or thinner, with the result that when the straw is distorted, it assumes a cross-sectional shape largely determined by the nature of the core itself, and this cross-sectional shape may be substantially round if the straw is stuffed tightly as shown in Fig. 8, the roundness of the straw being preserved even after it is bent as shown at 96 in Fig. 25 and 104 to 107 in Fig. 26, or if the straw is stuffed with material which does not firmly fill its interior as indicated in Fig. 7, such straw after being bent as illustrated in Figs. 18 to 21, may be somewhat flattened like ribbon. Therefore, the extent to which the straw is stuffed with a core may be varied to suit conditions.

I claim:

1. A transparent straw having a core substantially filling the interior of said straw, said core comprising a strand of decorative compressible fibrous material extending lengthwise through the bore of said straw, said core engaging the surface of the bore of said straw solely by compression of said fibrous material whereby said core is frictionally retained in the bore of said straw due to said compression.

2. A Cellophone straw having a core substantially filling the interior of said straw, said core comprising a strand of resilient fibrous material and a wire extending lengthwise along the bore of said straw.

3. A Cellophane straw having therein a strand of compressible material, said strand being compressed by the wall of said straw to a substantially smaller size than its normal uncompressed size.

OSCAR W. SCHROEDER.